United States Patent [19]
Pollack et al.

[11] Patent Number: 5,163,342
[45] Date of Patent: Nov. 17, 1992

[54] ADAPTIVE TRANSMISSION PRESSURE CONTROL WITH RUN-THROUGH DETECTION

[75] Inventors: Scott B. Pollack, Livonia; Joseph L. Wanamaker, Tecumseh, both of Mich.

[73] Assignee: General Motors Corporation, Detroit, Mich.

[21] Appl. No.: 862,924

[22] Filed: Apr. 3, 1992

[51] Int. Cl.$^5$ ............................................. B60K 41/06
[52] U.S. Cl. ......................................... 74/866; 74/867; 364/424.1
[58] Field of Search ................. 74/866, 867; 364/424.1

[56] References Cited

U.S. PATENT DOCUMENTS

| | | | |
|---|---|---|---|
| 4,722,247 | 2/1988 | Shindo et al. | 74/866 OR |
| 4,811,223 | 3/1989 | Iwatsuki et al. | 74/866 X |
| 4,846,021 | 7/1989 | Hamano et al. | 74/866 OR |
| 4,981,053 | 1/1991 | Yamaguchi | 74/866 |
| 4,982,621 | 1/1991 | Sano | 74/866 |
| 4,998,451 | 3/1991 | Sano | 74/867 |
| 5,109,826 | 5/1992 | Kato | 74/866 X |
| 5,113,719 | 5/1992 | Suzuki et al. | 74/866 OR |

Primary Examiner—Leslie A. Braun
Assistant Examiner—Daniel Wittels
Attorney, Agent, or Firm—Mark A. Navarre

[57] ABSTRACT

An improved adaptive line pressure control which detects the occurrence of run-through and overrides the normal adaptive pressure control in response to a detected run-through condition so that the line pressure during subsequent shifting is increased instead of decreased. A run-through condition is detected by measuring and comparing first and second time indications corresponding, respectively, to the interval of ratio change during the shift (shift time), and the interval between the generation of a shift command and the actual initiation of ratio change (delay time).

9 Claims, 12 Drawing Sheets

| GEAR | RATIO | C1 | C2 | C3 | C4 | C5 | OC | CR |
|------|-------|-----|-----|-----|-----|-----|-----|-----|
| 1st | 3.61 | ON | OFF | OFF | ON | OFF | ON | OFF |
| 2nd | 1.85 | ON | ON | OFF | ON | OFF | ON | OFF |
| 3rd | 1.37 | ON | ON | OFF | ON | ON | OFF | OFF |
| 4th | 1.00 | ON | ON | ON | OFF | OFF | ON | OFF |
| 5th | 0.74 | ON | ON | ON | OFF | ON | OFF | OFF |
| P/N | — | OFF | OFF | OFF | OFF | OFF | ON | OFF |
| R | -2.06 | OFF | OFF | ON | OFF | OFF | ON | ON |

FIG. 2

| SOLENOID STATES ||||
|------|------------|------------|------------|
| GEAR | SOLENOID A | SOLENOID B | SOLENOID C |
| 1st | ON | OFF | ON |
| 2nd | OFF | OFF | ON |
| 3rd | OFF | ON | ON |
| 4th | OFF | OFF | OFF |
| 5th | OFF | ON | OFF |

FIG. 3

ADAPTIVE TRANSMISSION PRESSURE CONTROL WITH RUN-THROUGH DETECTION

This invention relates to adaptive pressure control in a motor vehicle automatic transmission, and more particularly, to a control which detects the occurrence of a run-through condition.

BACKGROUND OF THE INVENTION

Automatic transmissions of the type addressed by this invention include several fluid operated torque transmitting devices, referred to herein as clutches, which are automatically engaged and disengaged according to a predefined pattern to establish different speed ratios between input and output shafts of the transmission. The input shaft is coupled to an internal combustion engine through a fluid coupling, such as a torque converter, and the output shaft is mechanically connected to drive one or more vehicle wheels.

The various speed ratios of the transmission are typically defined in terms of the ratio Ni/No, where Ni is the input shaft speed and No is the output shaft speed. Speed ratios having a relatively high numerical value provide a relatively low output speed and are generally referred to as lower speed ratios; speed ratios having a relatively low numerical value provide a relatively high output speed and are generally referred to as upper speed ratios. Accordingly, shifts from a given speed ratio to a lower speed ratio are referred to as downshifts, while shifts from a given speed ratio to a higher speed ratio are referred to as upshifts.

In most transmissions, ratio shifting is carried out by selectively directing the fluid pressure output of a pump, referred to as line pressure, to the various clutches of the transmission through the use of one or more shift valves. To upshift from a lower speed ratio to a higher speed ratio, for example, a respective shift valve is activated (electrically or hydraulically) to initiate the supply of fluid pressure to the upper or target speed ratio (on-coming) clutch. Concurrently, the lower speed ratio (off-going) clutch is released, either by exhausting the fluid pressure supplied to it, or through the provision of a one-way device which overruns when the on-coming clutch achieves the required torque capacity.

In most transmissions, a hydraulic accumulator is used to control the supply of fluid pressure to the on-coming clutch. The accumulator absorbs a controlled volume of fluid in parallel with the on-coming clutch, producing a progressive increase in the clutch apply pressure as a piston of the accumulator strokes to compress an internal damper spring.

The average clutch apply pressure during accumulator stroking varies in direct relation to an accumulator bias or trim pressure which opposes the clutch apply pressure, and it is known that the firmness of a shift can be controlled to a desired value over the life of the transmission through adaptive adjustment of such trim pressure. See, for example, the U.S. Pat. No. 4,283,970 to Vukovich, issued Aug. 18, 1981, and U.S. Pat. No. 4,653,350 to Downs et al., issued Mar. 31, 1987, both of which are assigned to the assignee of the present invention. In these controls, the trim pressure varies with the transmission line pressure, and the line pressure is scheduled as a combined function of a base pressure value determined by table look-up and an adaptive pressure value based on a deviation between actual and desired shift times observed during a previous shift of the same type.

Under most conditions, the on-coming clutch engagement is completed during the stroking of the accumulator piston, minimizing the driveline torque disturbance during the shift. However, if the pressure supplied to the accumulator is too low, the initiation of clutch engagement may be delayed to the point where the accumulator piston completely strokes before the clutch fully engages. At the end of the accumulator stroke, the clutch pressure rapidly rises to line pressure, abruptly completing the clutch engagement. This condition is referred to herein as run-through because the shift is completed after the accumulator has "run-through" its stroke.

In addition to creating a harsh bump or clunk at the end of the shift, run-through disrupts the normal relationship between clutch apply pressure and shift time. As a result, the adaptive control may operate to decrease the line pressure even further in subsequent shifting. Various procedures have been proposed for the purpose of detecting the run-through condition, but none have proven to be sufficiently robust due to normal transmission-to-transmission variability.

SUMMARY OF THE PRESENT INVENTION

The present invention is directed to an improved adaptive pressure control which detects the occurrence of run-through, and overrides the normal adaptive pressure control in response to a detected run-through condition so that the line pressure during subsequent shifting is increased instead of decreased to prevent a recurrence of the run-through condition.

According to this invention, a run-through condition is detected by measuring and comparing first and second time indications. The first time indication, referred to herein as shift time, corresponds to the interval of ratio change during the shift. The second time indication, referred to herein as delay time, corresponds to the interval between the generation of a shift command and the actual initiation of ratio change. In general, a run-through condition is detected if a short shift time and a long delay time are both observed in a given upshift. In the illustrated embodiment, a limit delay time is empirically determined as a function of shift time, and a run-through condition is indicated when the measured delay time is longer than the limit delay time.

In the absence of a run-through indication, the control determines an adaptive pressure error in relation to a measured deviation between actual and desired shift times. This pressure error may be positive or negative for increasing or decreasing the base pressure command.

When a run-through condition is detected, however, the control generates a positive pressure error for increasing the base pressure command without regard to the deviation between actual and desired shift times. In this case, the pressure error is determined in relation to the deviation between the measured delay time and the limit delay time. The pressure error is formed by applying both the measured delay time and the limit delay time to a predetermined delay time vs. pressure characteristic of the on-coming clutch.

BRIEF DESCRIPTION OF THE DRAWINGS

FIG. 2 is a state diagram for the clutches of the transmission depicted in FIGS. 1a-1b.

FIG. 3 is a chart depicting the electrical state changes required for shifting from one speed ratio to another.

DETAILED DESCRIPTION OF THE INVENTION

Figure 1A:
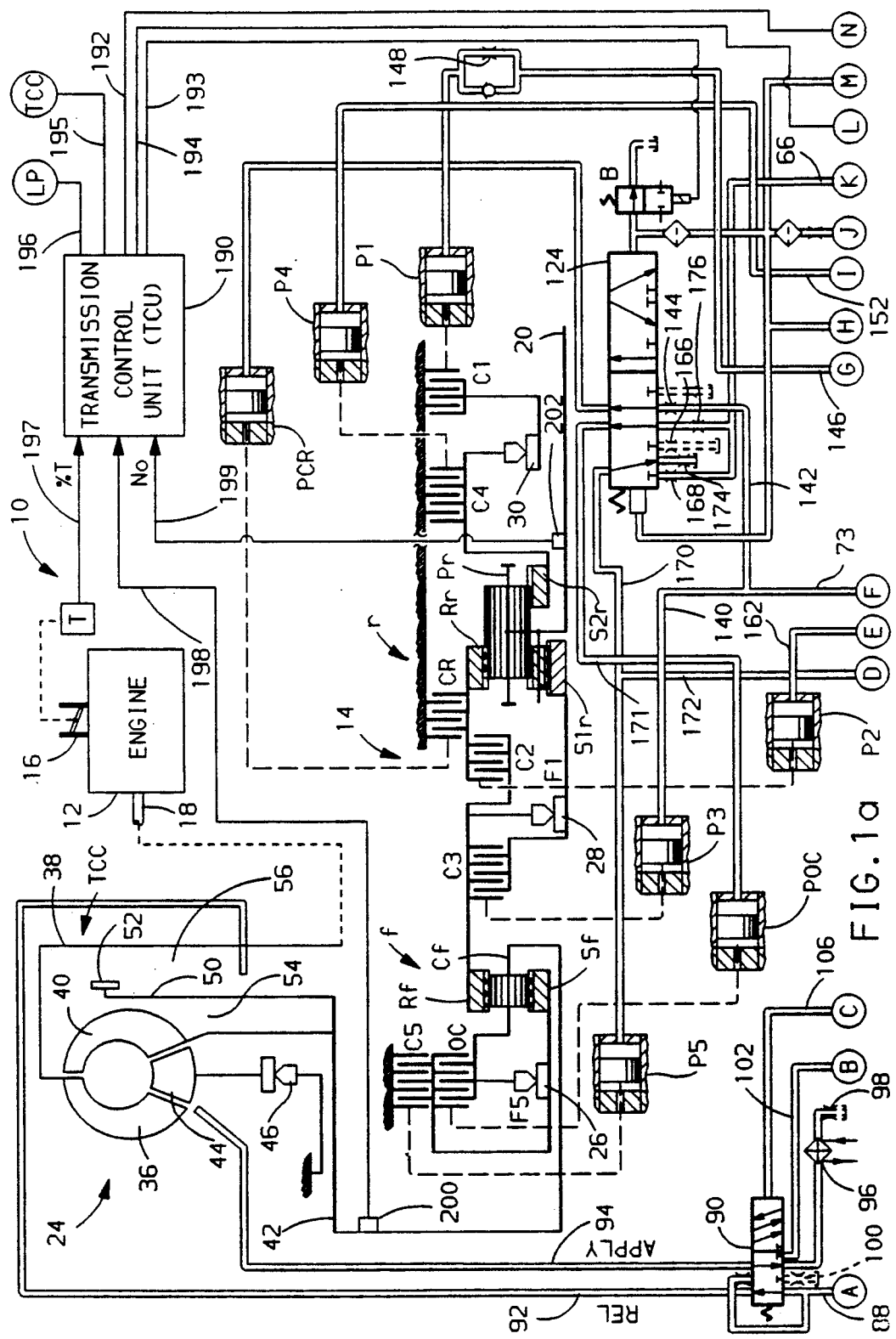
FIGS. 1a–1b form a schematic diagram of a five-speed automatic transmission controlled in accordance with this invention by a computer-based control unit.
Figure 1B:
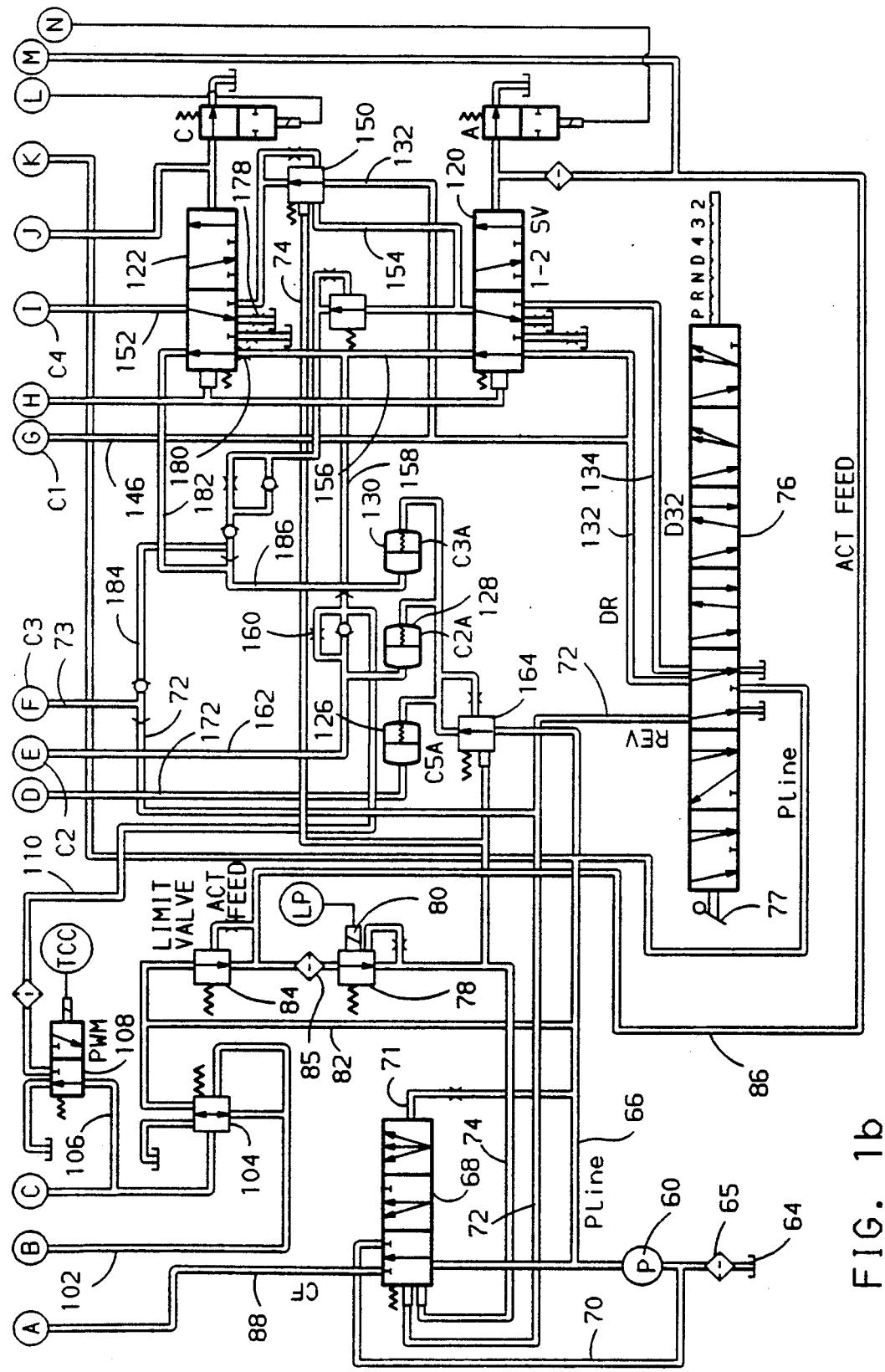

Referring now to FIGS. 1a-1b of the drawings, the reference numeral 10 generally designates a motor vehicle drivetrain including an engine 12 and a planetary transmission 14 having a reverse speed ratio and five forward speed ratios. Engine 12 includes a throttle mechanism 16 mechanically connected to an operator manipulated device, such as an accelerator pedal (not shown), for regulating the air intake of the engine. The engine 12 is fueled by a conventional method in relation to the air intake to produce output torque in proportion thereto. Such torque is applied to the transmission 14 through the engine output shaft 18. The transmission 14, in turn, transmits engine output torque to an output shaft 20 through a torque converter 24 and one or more of the fluid operated clutches C1-C5, OC, Reverse clutch CR, and one-way clutches 26-30, such clutches being applied or released according to a predetermined schedule for establishing a desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the turbine shaft 42. A stator member 44 redirects the fluid which couples the impeller 36 to the turbine 40, the stator being connected through a one-way device 46 to the housing of transmission 14.

The torque converter 24 also includes a clutch TCC comprising a clutch plate 50 secured to the turbine shaft 42. The clutch plate 50 has a friction surface 52 formed thereon adaptable to be engaged with the inner surface of the input shell 38 to form a direct mechanical drive between the engine output shaft 18 and the turbine shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38, thereby engaging the TCC to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38, as shown in FIG. 1a, thereby uncoupling such mechanical drive connection and permitting slippage between the impeller 36 and the turbine 40.

The turbine shaft 42 is connected as an input to the carrier Cf of a forward planetary gearset f. The sun Sf is connected to carrier Cf via the parallel combination of one-way clutch F5 and friction clutch OC. The clutch C5 is selectively engageable to ground the sun Sf. The ring Rf is connected as an input to the sun S1r of a compound rearward planetary gearset r via the parallel combination of one-way clutch F1 and friction clutch C3. The clutch C2 selectively connects the forward gearset ring Rf to rearward gearset ring Rr, and the Reverse clutch CR selectively grounds the ring Rr. The sun S2r is selectively grounded by clutch C4 or by clutch C1 through the one-way clutch F2. The pinion Pr mechanically couples the pinion gears and is connected as an output to shaft 20.

The various speed ratios and the clutch states required to establish them are set forth in the chart of FIG. 2. Referring to that Figure, it is seen that the Park/Neutral condition is established by releasing all of the clutches with the exception of clutch OC. A garage shift to Reverse is effected by engaging the C3 and CR clutches. In the forward speed ranges, a garage shift to 1st is effected by engaging the clutches C1 and C4. In this case, the forward gearset f is locked up and the one-way clutch F1 applies the turbine speed Nt as an input to the sun element Sr of rearward gearset r, providing a Ni/No ratio of 3.61.

As the vehicle speed increases, an upshift from 1st to 2nd is effected simply by engaging clutch C2; the one-way clutch F1 overruns as soon as on-coming clutch C2 develops sufficient torque capacity. The forward gearset f remains locked up, and the clutch C2 applies the turbine speed Nt as an input to the ring element Rr of rearward gearset r to provide a Ni/No ratio of 1.85. Downshifting from 2nd to 1st merely involves releasing clutch C2.

The upshift from 2nd to 3rd is effected by engaging clutch C5 and releasing clutch OC so that the forward gearset operates as an overdrive, thereby providing a Ni/No ratio of 1.37. Downshifting from 3rd to 2nd is effected by releasing clutch C5 and engaging clutch OC to return the forward gearset f to a lock-up condition.

The upshift from 3rd and 4th is effected by releasing clutch C5 and engaging clutch OC to return the forward gearset f to a lock-up condition, while releasing clutch C4 and engaging clutch C3 to lock-up the rearward gearset r, one-way clutch F2 releasing the rear planet axis Pr. In this case, the turbine speed Nt is transmitted directly to output shaft 20 for a Ni/No ratio of 1.00. The downshift 4th to 3rd is effected by releasing clutch OC and engaging clutch C5 to return the forward gearset f to an overdrive condition, while releasing clutch C3 and engaging clutch C4 to apply the turbine speed Nt as an input to the ring element Rr.

Completing the shift analysis, the upshift from 4th to 5th is effected by engaging clutch C5 (and releasing clutch OC if engine braking is selected) to operate the forward gearset f in an overdrive condition, thereby providing a Ni/No ratio of 0.74. Downshifting from 5th to 4th is effected by releasing clutch C5 (and engaging clutch OC if engine braking is selected).

A positive displacement hydraulic pump 60 is mechanically driven by the engine output shaft 18. Pump 60 receives hydraulic fluid at low pressure from the fluid reservoir 64 and filter 65, and supplies line pressure fluid to the transmission control elements via output line 66. A pressure regulator valve (PRV) 68 is connected to the pump output line 66 and serves to regulate the line pressure by returning a controlled portion of the line pressure to reservoir 64 via the line 70. The PRV 68 is biased at one end by orificed line pressure in line 71 and at the other end by the combination of a spring force, a Reverse ratio fluid pressure in line 72 and a controlled bias pressure in line 74.

The Reverse fluid pressure is supplied by a Manual Valve 76, described below. The controlled bias pressure is supplied by a Line Pressure Bias Valve 78 which develops pressure in relation to the current supplied to electric force motor 80. Line pressure is supplied as an input to valve 78 via line 82, a pressure limiting valve 84 and filter 85. The limited line pressure, referred to as ACT FEED pressure, is also supplied as an input to other electrically operated actuators of the control system via line 86. With the above-described valving arrangement, it will be seen that the line pressure of the transmission is electrically regulated by force motor 80.

In addition to regulating line pressure, the PRV 68 develops a regulated converter feed (CF) pressure for the torque converter 24 in line 88. The CF pressure is supplied as an input to TCC Control Valve 90, which, in turn, directs the CF pressure to the release chamber 56 of torque converter 24 via line 92 when open converter operation is desired. In this case, the return fluid from torque converter 24 is exhausted via line 94, the TCC Control Valve 90, an oil cooler 96 and an orifice 98.

When closed converter operation is desired, the TCC Control Valve 90 exhausts the release chamber 56 of torque converter 24 to an orificed exhaust 100, and supplies a regulated TCC apply pressure in line 102 to the apply chamber 54, thereby engaging the TCC. The TCC apply pressure in line 102 is developed from line pressure by a TCC Regulator Valve 104.

Both the TCC Control Valve 90 and the TCC Regulator Valve 104 are spring biased to effect the open converter condition, and in each case, the spring force is opposed by an electrically developed control pressure in line 106. The control pressure in line 106 is developed by the solenoid operated TCC Bias Valve 108, through a ratiometric regulation of the fluid pressure in line 110.

When closed converter operation is desired, the solenoid of TCC Bias Valve 108 is pulse-width-modulated at a controlled duty cycle to ramp up the bias pressure in line 106. Bias pressures above the pressure required to shift the TCC Control Valve to the closed-converter state are used to control the TCC apply pressure developed in line 102 by TCC Regulator Valve 104. In this way, the TCC Bias Valve 108 is used to control the torque capacity of the TCC when closed converter operation is desired.

The friction clutches C1-C5, OC and CR are activated by conventional fluid operated pistons P1-P5, POC and PCR, respectively. The pistons, in turn, are connected to a fluid supply system comprising the Manual Valve 76 referred to above, the Shift Valves 120, 122 and 124, and the Accumulators 126, 128 and 130. The Manual Valve 76 develops supply pressures for Reverse (REV) and the various forward ranges (DR, D32) in response to driver positioning of the transmission range selector 77. The REV, DR and D32 pressures, in turn, are supplied via lines 72, 132 and 134 to the various Shift Valves 120-124 for application to the fluid operated pistons P1-P5, POC and PCR. The Shift Valves 120, 122 and 124 are each spring biased against controlled bias pressures, the controlled bias pressures being developed by the solenoid operated valves A, C and B. The accumulators 126, 128 and 130 are used to cushion the apply, and in some cases the release, of clutches C5, C2 and C3, respectively.

A chart of the ON/OFF states of valves A, C and B for establishing the various transmission speed ratios is given in FIG. 3. In Neutral and Park, the solenoids A, B and C are all off. In this condition, line pressure is supplied to clutch piston POC through orifice 176, but the remaining clutches are all disengaged. Reverse fluid pressure, when generated by Manual Valve 76 in response to driver displacement of range selector 77, is supplied directly to clutch piston P3 via lines 72, 73 and 140, and to clutch piston PCR via lines 72, 142, orifice 144 and Shift Valve 124.

A garage shift to the forward (Drive) ranges is effected when Manual Valve 76 is moved to the D position, connecting line pressure to the DR pressure supply line 132. The DR pressure is supplied to the clutch piston P1 via line 146 and orifice 148 to progressively engage clutch C1. At the same time, Solenoid Operated Valves A and C are energized to actuate Shift Valves 120 and 122. The Shift Valve 122 directs DR pressure in line 132 to clutch piston P4 via Regulator Valve 150 and line 152. The Shift Valve 120 supplies a bias pressure to the Regulator Valve 150 via line 154 to boost the C4 pressure. In this way, clutches C1, C4 and OC are engaged to establish 1st speed ratio.

Referring to the chart of FIG. 3, a 1-2 upshift is effected by deenergizing Solenoid Operated Valve A to return Shift Valve 120 to its default state. This routes DR pressure in line 132 to the clutch piston P2 via Shift Valve 120, lines 156, 158 and 162, and orifice 160 to engage the clutch C2. Line 162 is also connected as an input to accumulator 128, the backside of which is maintained at a regulated pressure developed by valve 164. The engagement of clutch C2 is thereby cushioned as the C2 apply pressure, resisted by spring force, strokes the piston of accumulator 128. Of course, a 2-1 downshift is effected by energizing the Solenoid Operated Valve A.

Referring again to the chart of FIG. 3, a 2-3 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch C5. Line 170 is connected via line 172 as an input to accumulator 126, the backside of which is maintained at a regulated pressure developed by valve 164. The engagement of clutch C5 is thereby cushioned as the C5 apply pressure, resisted by spring force, strokes the piston of accumulator 126. Of course, a 3-2 downshift is effected by deenergizing the Solenoid Operated Valve B.

Referring again to the chart of FIG. 3, a 3-4 upshift is effected by deenergizing Solenoid Operated Valves B and C to return Shift Valves 124 and 122 to their default positions, as depicted in FIGS. 1a-1b. The Shift Valve 124 thereby (1) exhausts clutch piston P5 and accumulator 126 via line 170 and orifice 174 to release clutch C5, and (2) supplies pressure to clutch piston POC via lines 66 and 171 and orifice 176 to engage clutch OC. The Shift Valve 122 (1) exhausts clutch piston P4 via line 152 and orifice 178 to release clutch C4, and (2) supplies DR pressure in line 132 to clutch piston P3 via Shift Valve 120, orifice 180 and lines 182, 184, 73 and 140 to engage clutch C3.

Line 182 is connected via line 186 as an input to accumulator 130, the backside of which is maintained at a regulated pressure developed by valve 164. The engagement of clutch C3 is thereby cushioned as the C3 apply pressure, resisted by spring force, strokes the piston of accumulator 130. Of course, a 4–3 downshift is effected by energizing the Solenoid Operated Valves B and C.

Referring again to the chart of FIG. 3, a 4–5 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch P5. As indicated below, line 170 is also connected via line 172 as an input to accumulator 126, which cushions the engagement of clutch C5 as the C5 apply pressure, resisted by spring force, strokes the piston of accumulator 126. Of course, a 5–4 downshift is effected by deenergizing the Solenoid Operated Valve B.

The Solenoid Operated Valves A, B and C, the TCC Bias Valve 108 and the Line Pressure Bias Valve 78 are all controlled by a computer-based Transmission Control Unit (TCU) 190 via lines 192–196. As indicated above, the valves A, B and C require simple on/off controls, while the valves 108 and 78 are pulse-width-modulated (PWM). The control is carried out in response to a number of input signals, including an engine throttle signal %T on line 197, a turbine speed signal Nt on line 198 and an output speed signal No on line 199. The throttle signal is based on the position of engine throttle 16, as sensed by transducer T; the turbine speed signal is based on the speed of turbine shaft 42, as sensed by sensor 200; and the output speed signal is based on the speed of output shaft 20, as sensed by sensor 202. In carrying out the control, the TCU 190 executes a series of computer program instructions, represented by the flow diagrams of FIGS. 9–11 described below.

As indicated above, the present invention concerns the detection of an abnormal shifting condition referred to as run-through. As indicated above, the full engagement of the on-coming clutch normally occurs prior to the end of stroke of the respective accumulator 126, 128, 130. This condition is graphically depicted by the upper and lower traces of FIG. 4 which respectively represent the actual transmission speed ratio (Nt/No) and the on-coming clutch apply pressure.

The solenoid states are activated at time t0 to initiate the shift, directing fluid pressure to the respective clutch apply circuit. When the apply chamber of the respective clutch piston is filled and the friction surfaces of the respective clutch are brought into engagement at time t1, the clutch pressure jumps to an initial level, designated in the lower trace as Pinit. The pressure Pinit is determined by the line pressure, the accumulator spring force and the fluid pressure applied to the spring side of the accumulator piston. When the line pressure is increased, Pinit is increased; when the line pressure is decreased, Pinit is decreased.

After time t1, the accumulator spring begins to compress, and the clutch pressure progressively increases toward line pressure Pline as shown. When the pressure reaches P1 at time t2, the torque capacity of the oncoming clutch achieves a critical capacity, at which the turbine speed begins to fall and the measured ratio begins its transition from 2nd to 3rd. At time t3, the clutch is fully engaged to complete the ratio progression, as seen in the upper trace. The stroke of the accumulator piston is completed at time t4, at which point the clutch pressure rapidly increases to the line pressure Pline, as seen in the lower trace. Since the clutch is fully engaged prior to time t4, the abrupt rise in pressure occurring at the end of the accumulator stroke is not perceived by the occupants of the vehicle.

As set forth in the above-referenced Vukovich and Downs et al. patents, shift quality is determined by measuring the actual shift time and comparing the actual shift time with a reference or desired time. In this regard, the best results are achieved by computing the percentage of ratio completion (RATCOMP), and measuring the time elapsed during a predetermined portion of the ratio progression, as graphically illustrated in the upper trace of FIG. 4. In the illustrated embodiment, for example, the measured shift time is defined as the interval between 20% and 80% ratio completion, or the interval between times ta and tb.

Figure 4A:
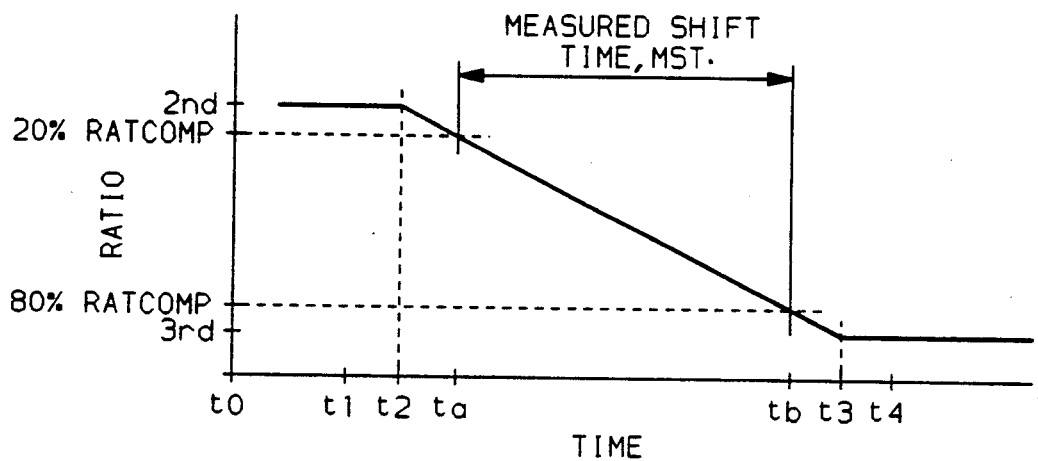
FIGS. 4a-4b and 5a-5b graphically illustrate shift parameters for normal and run-through upshifts, respectively.
Figure 4B:
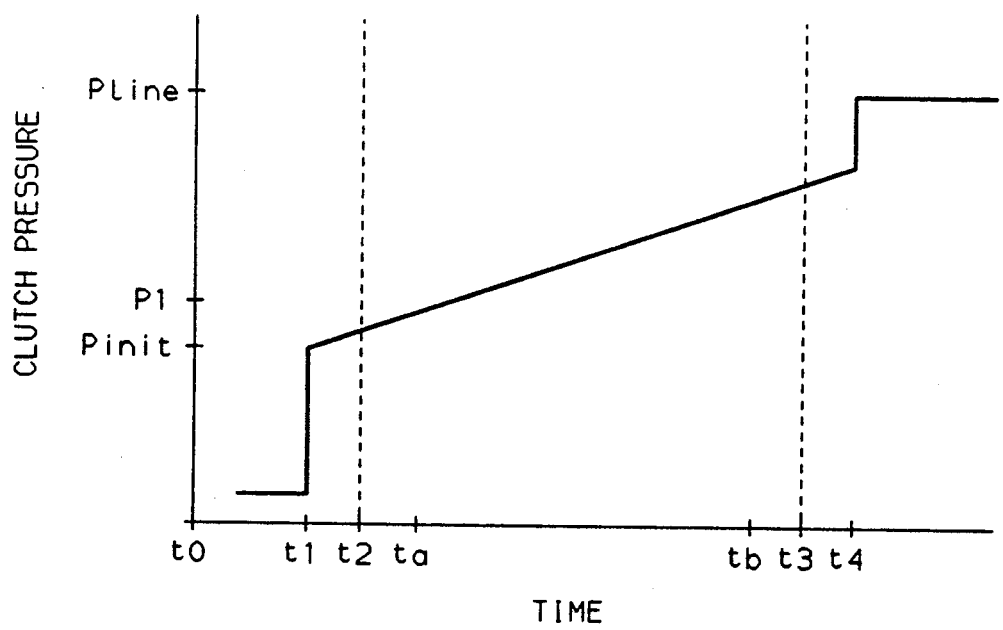
Figure 5A:
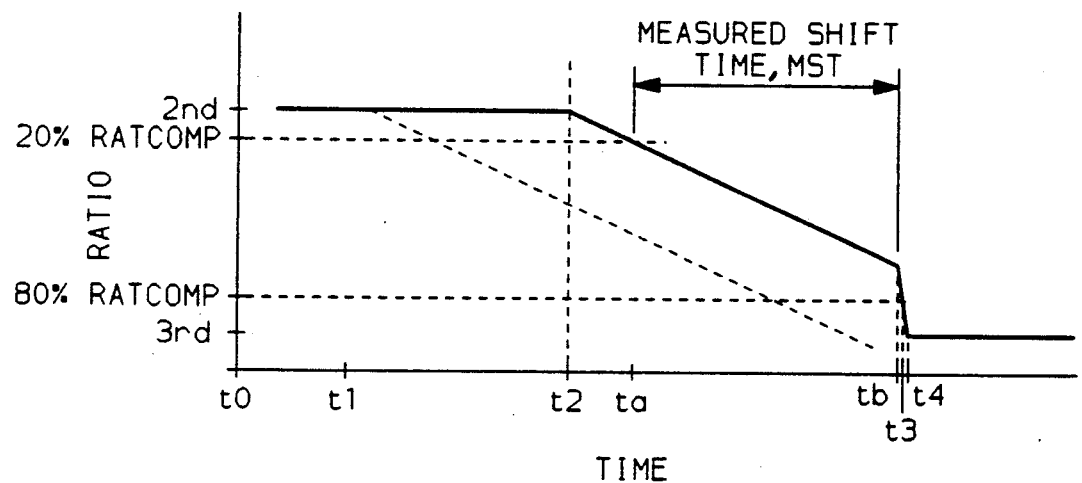
Figure 5B:
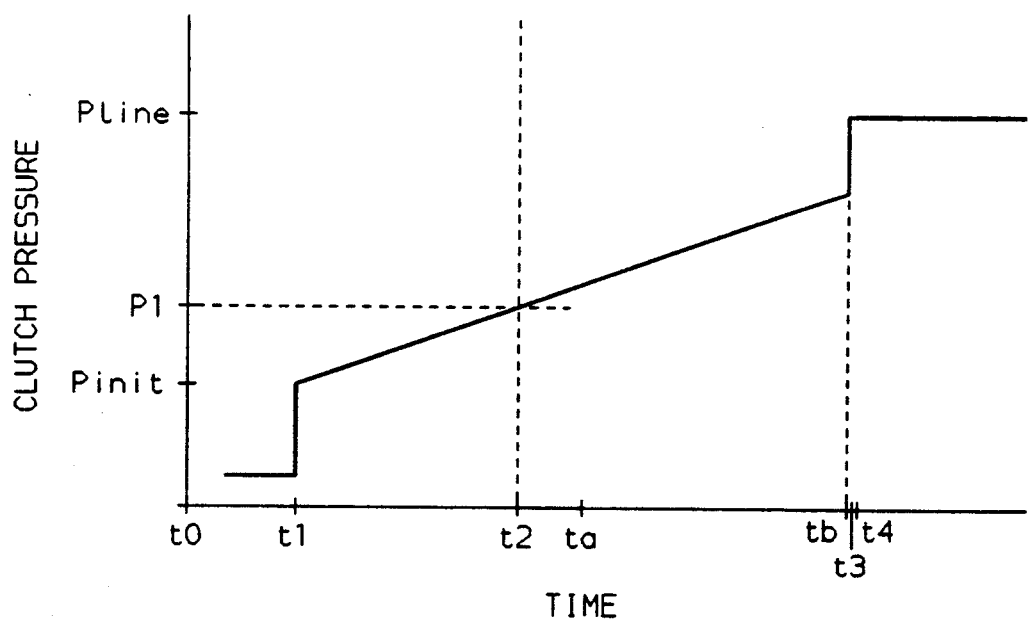

FIG. 5 graphically depicts an upshift carried out at an abnormally low line pressure, resulting in a run-through condition. Since the entire pressure profile is correspondingly lowered, the achievement of critical clutch pressure P1 (time t2) is significantly delayed, compared to the normal shift of FIG. 4. Hence, the start of ratio change is likewise delayed, and the shift is still in progress at the end of the accumulator stroke. In the illustrated example, time tb (80% RATCOMP), time t4 (end of accumulator stroke) and time t3 (end of shift) occur substantially at the same time, as indicated. The rapid rise in clutch pressure associated with the end of accumulator stroking produces an abrupt increase in the rate of shift completion, resulting in a poor quality shift.

Referring to the upper trace of FIG. 5, it is seen that the measured shift time in the case of a run-through shift is significantly shorter than for the normal shift depicted in FIG. 4. This is contrary to the pressure vs. shift time relationship observed during normal (nonrun-through) shifting. In normal shifting, a shorter than desired shift time signals the need to decrease clutch pressure in the next similar shift. However, in a run-through shifting, the shorter than desired shift time is caused by abnormally low pressure. Decreasing the pressure even further would only exacerbate the run-through condition in the next shift.

The control of this invention avoids the above-described operation by adaptively increasing the pressure for subsequent shifting regardless of the shift time error when the occurrence of a run-through condition is detected. Run-through shifting is detected, according to this invention, by determining the relative values of the shift time and the delay time between shift initiation (t0) and the initiation of ratio progression (ta). As described below in reference to the system diagram of FIG. 8, a limit delay time is empirically determined as a function of shift time, and a run-through condition is indicated when the measured delay time is longer than the limit delay time.

Figure 6:
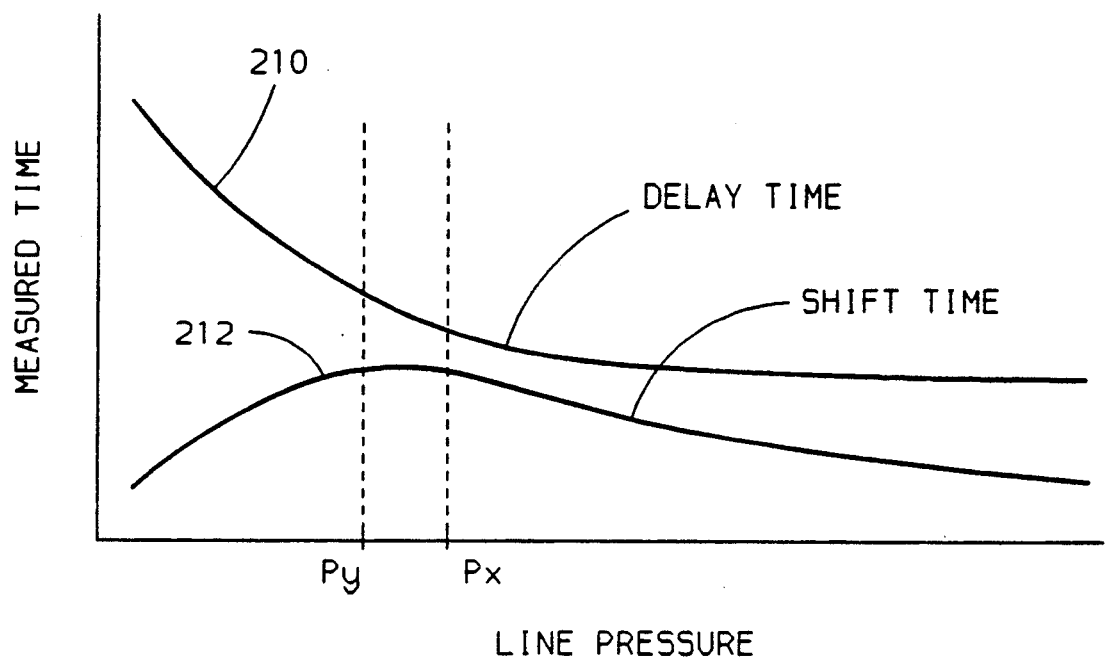
FIG. 6 graphically illustrates measured delay time and shift time characteristics as a function of line pressure.

Traces 210 and 212 of FIG. 6 respectively depict delay times (t0−ta) and shift times (ta−tb) measured in the course of upshifting with various levels of line pressure for a given input torque. Shifting performed at line pressures in excess of Px are considered to be normal in the sense of FIG. 4, in that the ratio progression is completed or substantially completed during the stroke of the respective accumulator. Under this condition, both the delay time and the shift time decrease in generally linear fashion with increasing line pressure, as seen in the right-hand portion of the traces 210 and 212. It is this relationship upon which the known adaptive pressure control is based, as described above.

As the line pressure falls below Px, however, the delay time increases as described above in reference to the run-through illustration of FIG. 5. As the pressure is further lowered, below pressure Py for example, the run-through condition additionally impacts the measured shift time as illustrated in the example of FIG. 5, effectively reversing the shift time vs. line pressure relationship upon which the adaptive pressure control is based.

Figure 7:
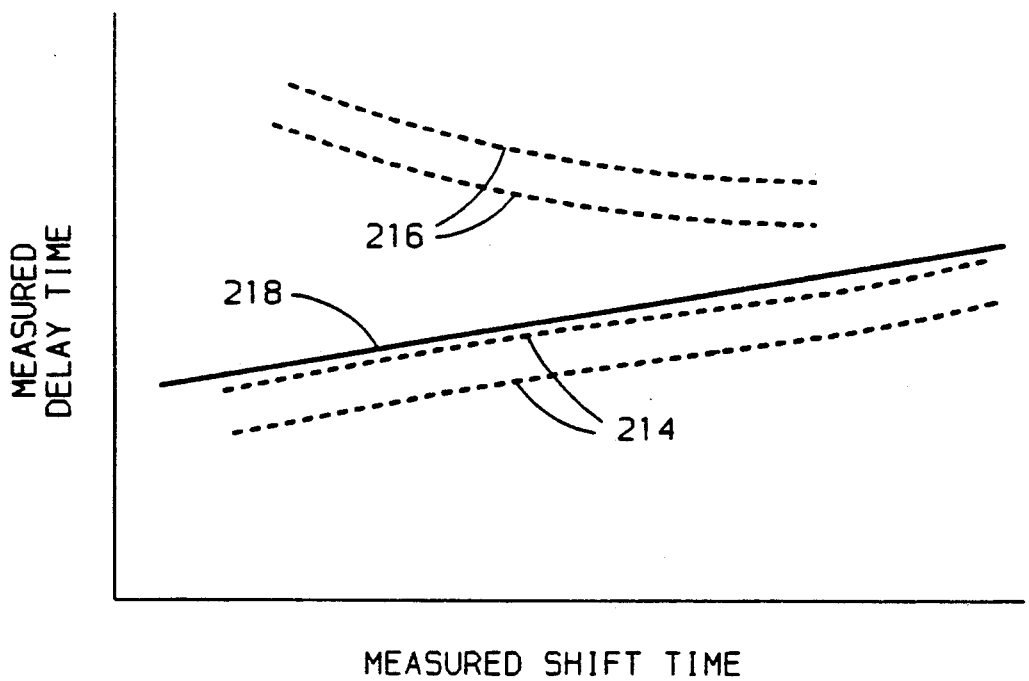
FIG. 7 graphically depicts a characteristic relationship between measured shift time and delay time which is utilized to detect a run-through condition according to this invention.

The above-described divergence of shift time and delay time is utilized according to this invention as a means of detecting the occurrence of a run-through condition. FIG. 7 plots the relationship between the measured delay times and shift times of FIG. 6 for various values of line pressure. The times measured during normal (nonrun-through) shifting fall generally within the band defined by the broken traces 214, while the times measured during run-through shifting fall generally within the band defined by the broken traces 216.

The control of this invention effectively establishes a threshold of acceptable shifting, as defined by the solid trace 218. If the delay time vs. shift time operating point falls below the line 218, normal shifting is indicated and the adaptive pressure control is permitted to suitably correct the scheduled line pressure in relation to the shift time error, as described, for example, in the above-mentioned Vukovich and Downs et al. patents. However, if the delay time vs. shift time operating point falls above the line 218, run-through shifting is indicated and the adaptive pressure correction is increased regardless of the shift time error. The magnitude of such increase is determined in relation to the deviation between the measured operating point and the line 218 so that the run-through condition may be eliminated without numerous iterative correction steps.

In the illustrated embodiment, the threshold, designated by line 218 in FIG. 7, is defined by storing a limit delay time (LDT) as a function of measured shift time (MST). If the measured delay time (MDT) is longer than the limit delay time (LDT), a run-through condition is indicated and a pressure increase is determined in relation to the difference (MDT−LDT). Of course, the opposite arrangement could be utilized alternatively—that is, store a limit shift time as a function of measured delay time and compare measured shift time to the limit shift time.

Figure 8:
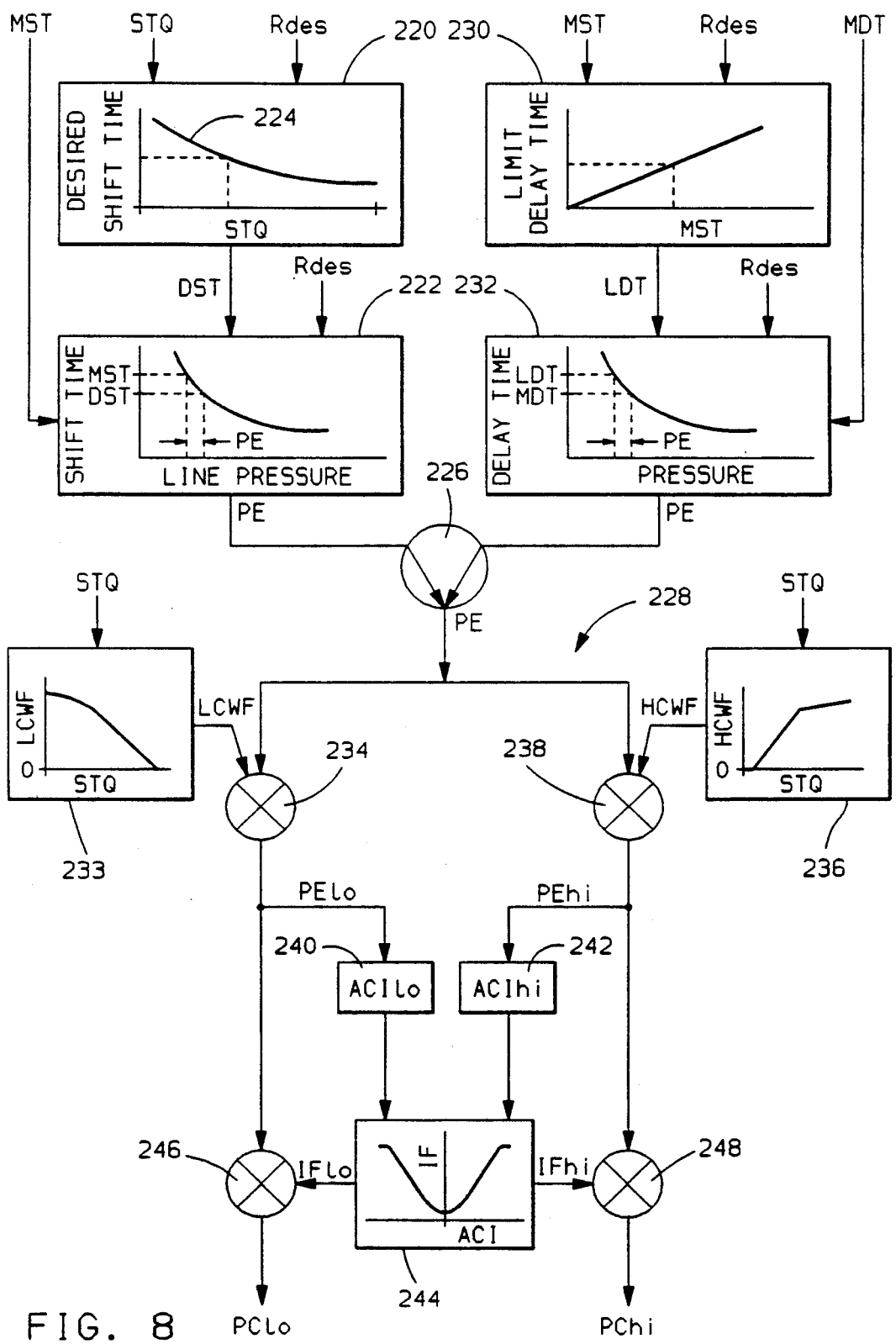
FIG. 8 is a schematic diagram of the control of this invention.

A schematic diagram of the control of this invention is depicted in FIG. 8. In normal (nonrun-through) operation, the blocks 220 and 222 determine an overall pressure error PE upon completion of each scheduled upshift. The block 220 provides a desired shift time (DST) as a function of the target speed ratio Rdes and an estimate of the shift torque, STQ. The shift torque STQ is determined according to the sum of the gearset input torque and the inertia torque required to complete the shift. The gearset torque may be computed in relation to the product of the engine output torque and the estimated torque multiplication provided by torque converter 24. The inertia torque may be estimated in relation to the turbine speed Nt at the initiation of the shift.

The trace 224, shown within the block 220, represents the stored DST vs. TPS relationship for a given target ratio.

The desired shift time DST developed at block 220, the measured shift time MST, and the target speed ratio Rdes are provided as inputs to the block 222 for the purpose of developing the pressure error PE. The block 222 stores an empirically derived relationship between measured shift time MST and transmission line pressure for each target speed ratio, similar to the right-hand portion of the trace 212 described above in reference to FIG. 6. Both the measured shift time MST and the desired shift time DST are applied to the stored function to determine corresponding line pressure values Pmst and Pdst. The difference between the pressure values (Pmst−Pdst) forms the pressure error output PE. Significantly, the pressure error can be positive or negative, for respectively increasing or decreasing the scheduled line pressure in subsequent shifting of the same type.

In the absence of run-through detection, the pressure error from block 222 is applied via the logic gate 226 to the error characterization portion of the control, designated generally by the reference numeral 228. This portion of the control, described below in detail, forms high and low pressure correction amounts PChi and PClo based on the pressure error PE output of logic gate 226.

In parallel with the determination of the pressure error PE based on desired shift time (blocks 220-222), the control of this invention determines an alternate pressure error PE based on a limit delay time LDT. This portion of the control is illustrated by the blocks 230 and 232. The block 230 provides the limit delay time LDT as a function of the measured shift time MST and target speed ratio Rdes, based on the trace 218 described above in reference to FIG. 7. The limit delay time LDT developed at block 230, the measured delay time MDT, and the target speed ratio Rdes are provided as inputs to the block 232 for the purpose of developing a pressure error PE. The block 232 stores an empirically derived relationship between measured delay time MDT and transmission line pressure for each target speed ratio, similar to the trace 210 described above in reference to FIG. 6. If the measured delay time exceeds the limit delay time, both times are applied to the stored function to determine corresponding line pressure values Pmdt and Pldt. The difference between the pressure values (Pldt−Pmdt) forms the pressure error output PE. Unlike the DST-based pressure error, this pressure error is only applied if it is positive.

The run-through pressure error PE is applied as an input to the logic gate 226 along with the normal pressure error PE. The logic gate 226 operates to pass the normal pressure error in the absence of a run-through detection as indicated above, but alternately operates to pass the run-through pressure error when a run-through condition has been detected. Thus, the run-through pressure error may be viewed as an override of the normal adaptive pressure control.

As noted above, the error characterization control portion 228 forms high and low pressure correction amounts PChi and PClo based on the pressure error PE output of logic gate 226. These correction amounts define a two-point table of pressure correction as a function of shift torque STQ. As described below in reference to the flow diagram of FIG. 10, the pressure command during shifting is determined as a combined function of the scheduled base pressure and the correction value determined from the two-point correction table.

The error characterization control portion initially apportions the pressure error PE between high and low pressure error values PEhi and PElo through the operation of blocks 233–238. The blocks 233 and 236 develop low and high cell weight factors LCWF and HCWF in relation to the shift torque STQ, and the weight factors LCWF and HCWF are applied to the pressure error PE at blocks 234 and 238 to form the low and high pressure error values PElo and PEhi. The low and high pressure error values PElo and PEhi are individually integrated at blocks 240 and 242, and applied to the gain table of block 244 to form low and high integral factors IFlo and IFhi. The integral factors IFlo and IFhi, in turn, are applied to PElo and PEhi at blocks 246 and 248, respectively, to form the low and high pressure correction terms PClo and PChi.

Figure 9:
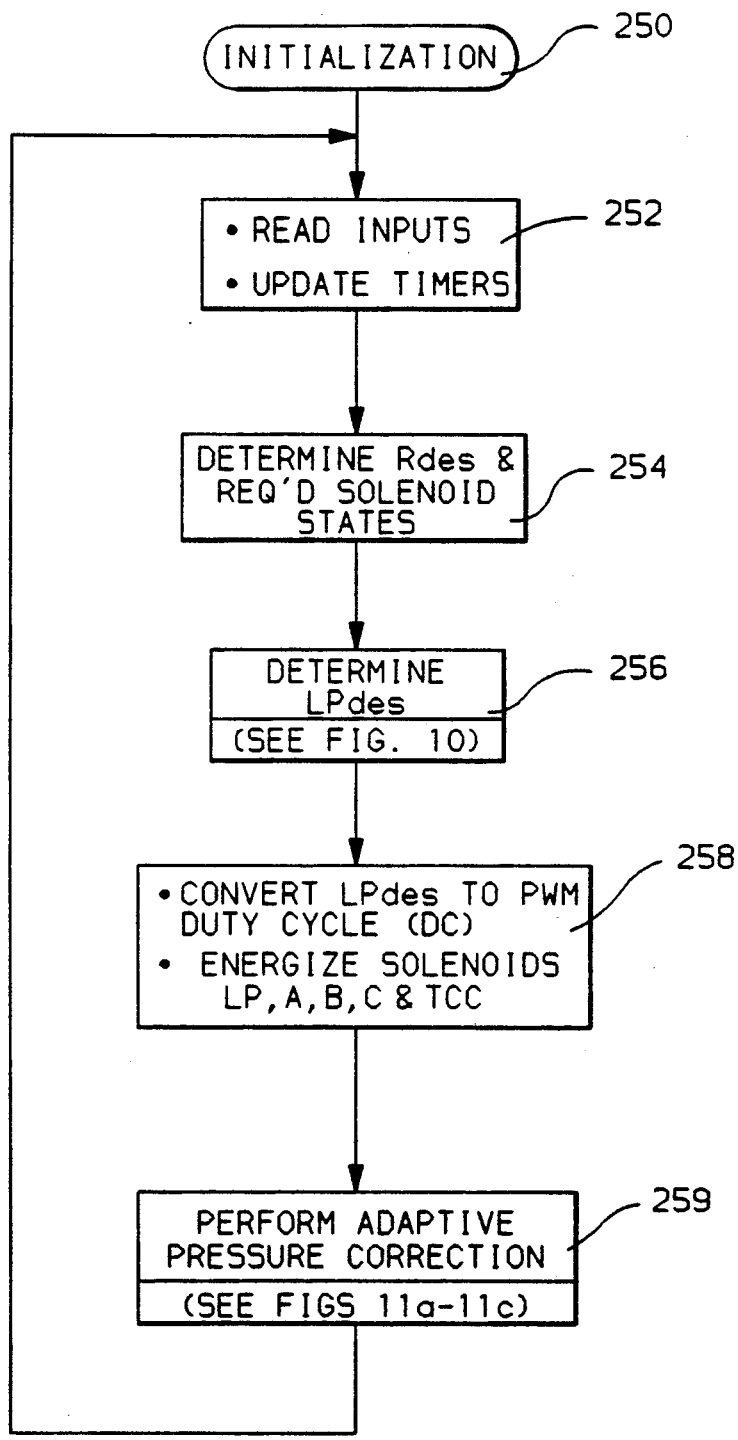
FIGS. 9-10 and 11a-11c depict flow diagrams representative of computer program instructions executed by the control unit of FIG. 1a in carrying out the control of this invention.
Figure 10:
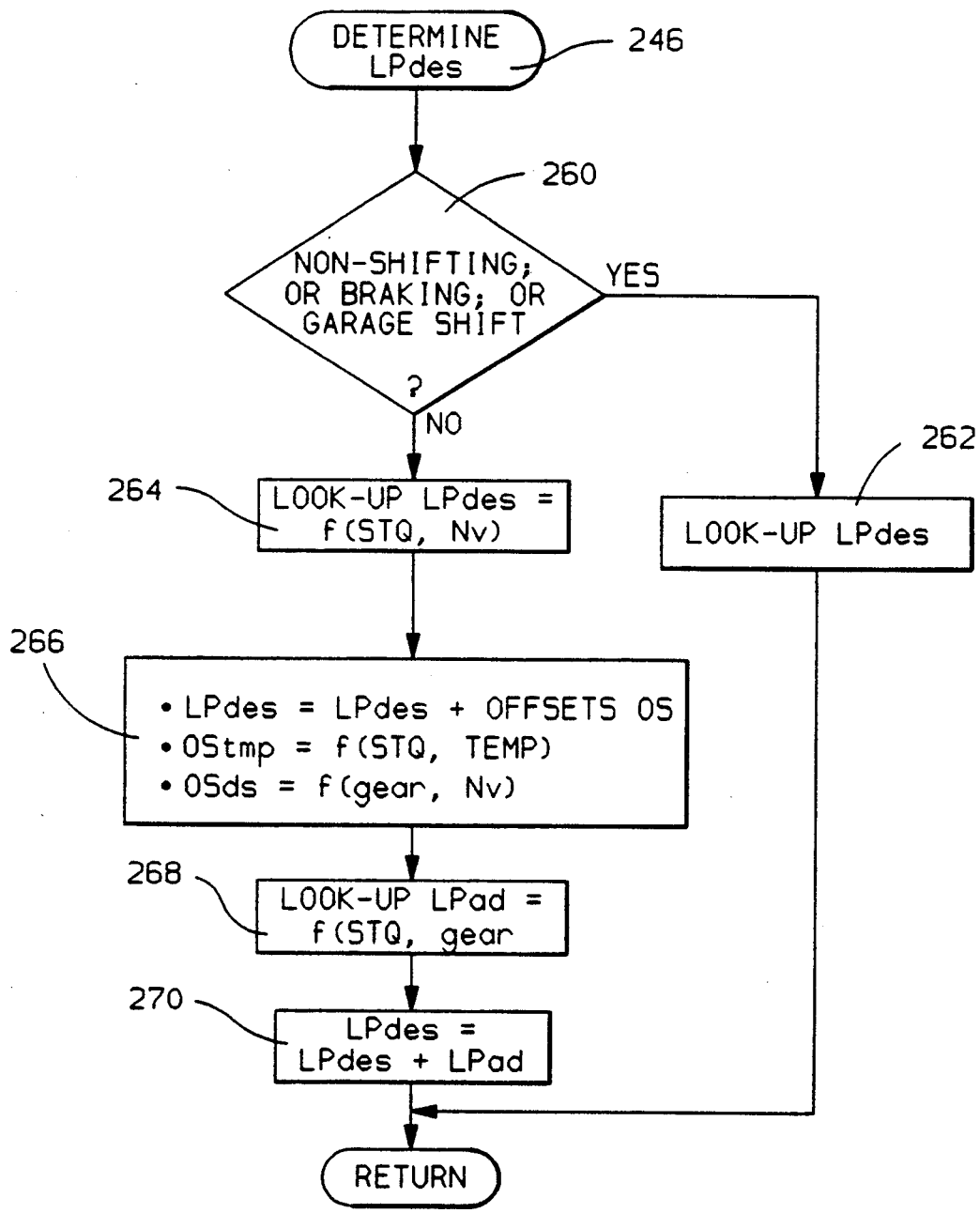

Referring now to FIGS. 9–11, the flow diagram of FIG. 9 represents a main or executive computer program which is periodically executed in the course of vehicle operation in carrying out the control of this invention. The block 250 designates a series of program instructions executed at the initiation of each period of vehicle operation for setting various terms and timer values to an initial condition. Thereafter, the blocks 254–259 are sequentially and repeatedly executed as indicated by the flow diagram lines.

At block 252, the control unit 190 reads the various inputs referenced in FIG. 1a and updates the loop timers, if any. The block 254 determines the desired speed ratio Rdes and required states of solenoids A, B and C for achieving the desired speed ratio. The desired ratio Rdes may be determined in a conventional manner as a predefined function of engine throttle position TPS and vehicle speed Nv.

The block 256, described in further detail in the flow diagram of FIG. 10, determines the desired line pressure LPdes. The block 258 converts the desired line pressure LPdes to a PWM duty cycle for force motor 80, and suitably energizes the various electro-hydraulic elements, including the force motor 80, the TCC solenoid valve 108, and shift valve solenoids A, B and C. The block 259, described in further detail in the flow diagram of FIG. 11, develops adaptive pressure corrections as described above in respect to the control system diagram of FIG. 8.

Referring to the line pressure determination flow diagram of FIG. 10, the block 260 is first executed to determine if the transmission is in a nonshifting mode, an engine braking mode, or if a garage shift is in progress. If any of these conditions are true, the block 262 is executed to determine the desired line pressure LPdes using mode-specific look-up tables, not described herein. Otherwise, the transmission is in a shifting mode, and the blocks 264–270 are executed to look-up the base line pressure LPdes as a function of shift torque STQ and vehicle speed Nv, to apply the appropriate offsets, and to look-up and apply the adaptive correction amount LPad.

The offsets identified in block 266 include a downshift offset OSds and a temperature offset OStemp. The downshift offset OSds is determined as a function of gear and vehicle speed Nv, and the temperature offset OStemp is determined as a function of the transmission oil temperature.

As noted above in respect to the control system diagram of FIG. 8, the adaptive pressure correction LPad is determined as a function of the shift torque STQ and the target speed ratio. This look-up involves an interpolation between the high and low pressure correction values PChi and PClo defined in reference to FIG. 8.

Figure 11A:
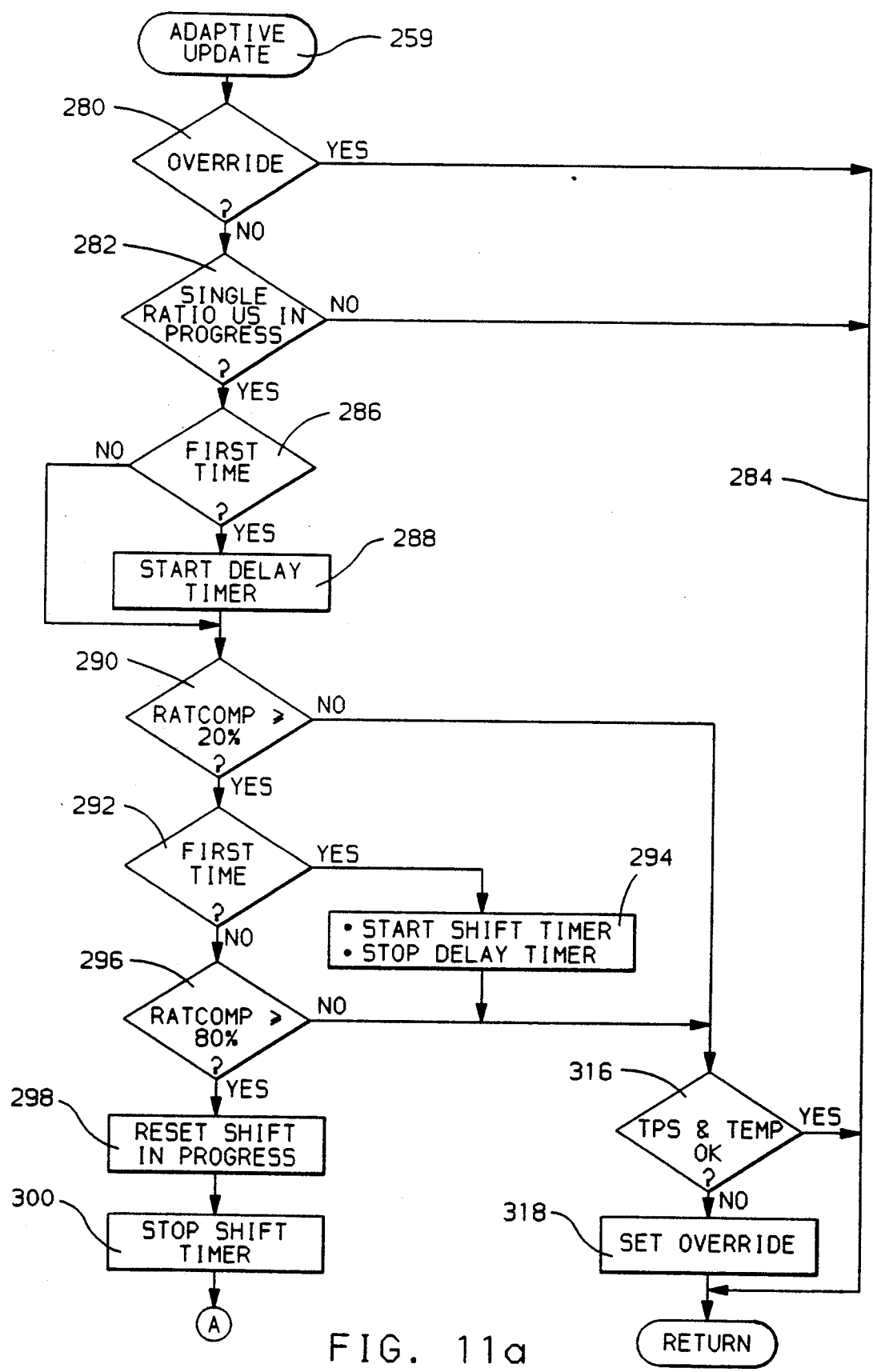
Figure 11B:
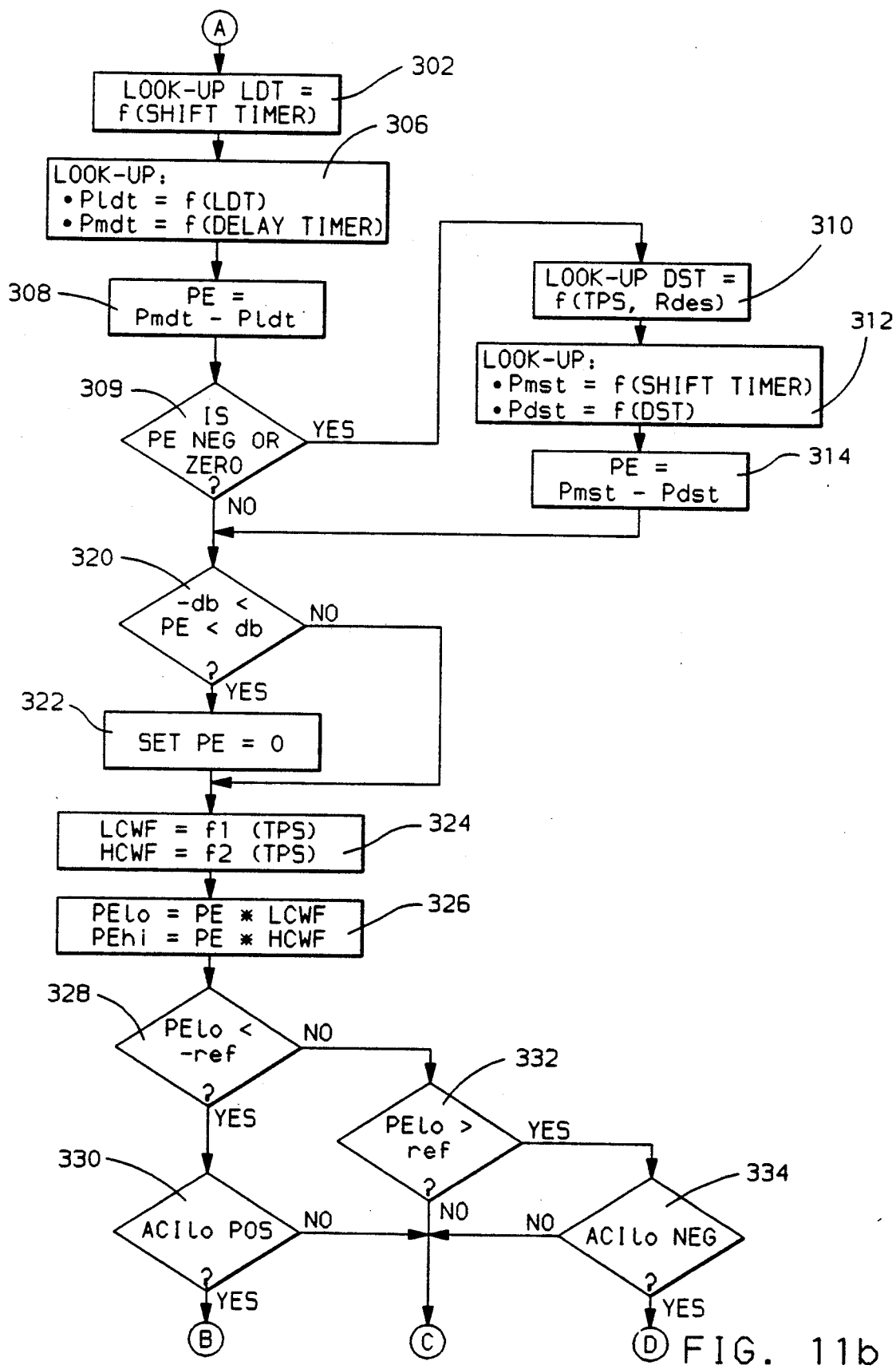
Figure 11C:
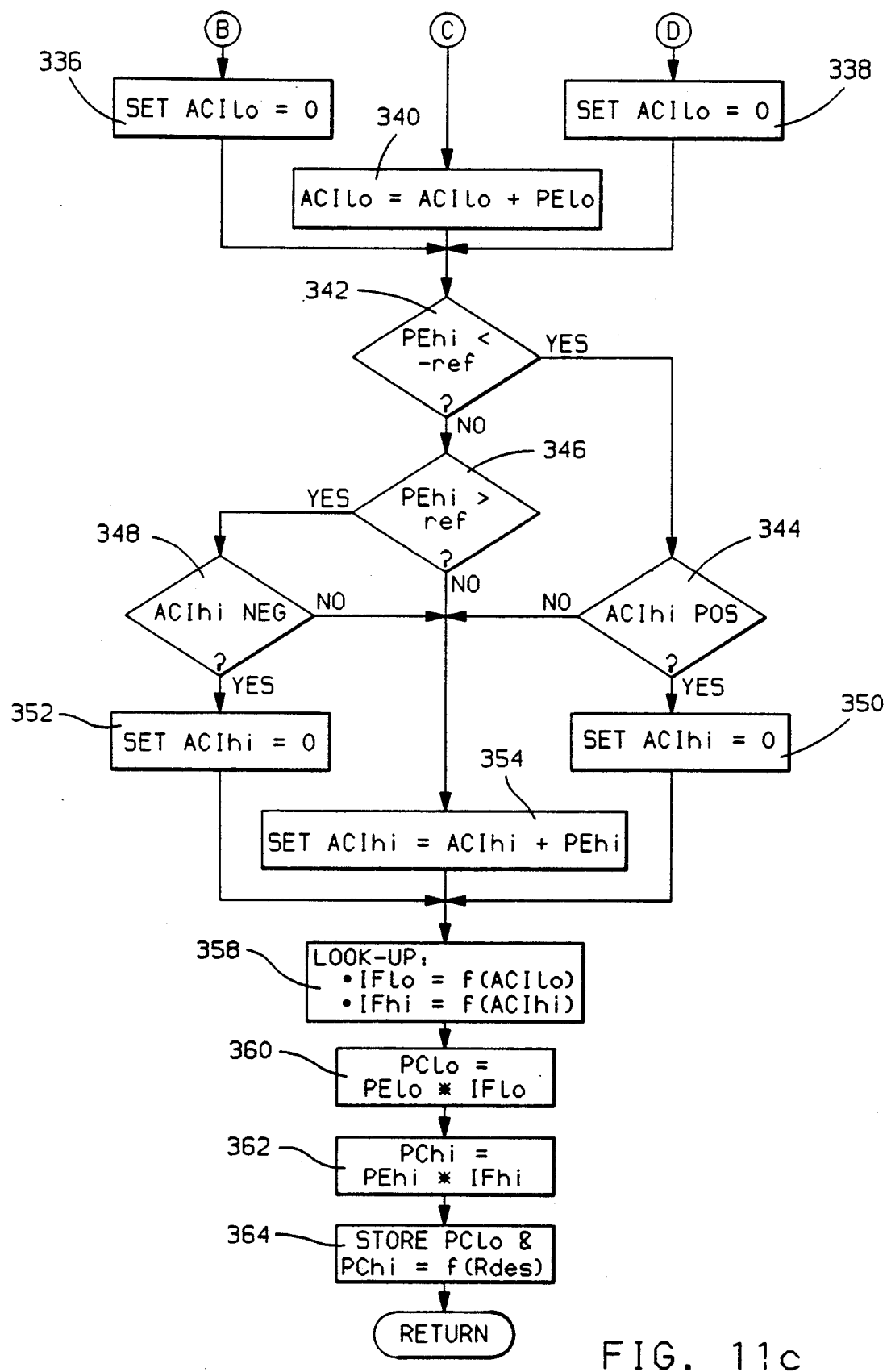

In the adaptive update flow diagram of FIGS. 11a–11c, the control unit 190 measures the delay time t0 — ta and the shift time ta — tb as defined in reference to FIGS. 4 and 5, and develops the high and low pressure correction terms PChi and PClo defined in reference to FIG. 8. If an override of adaptive updating is in effect or a single ratio upshift is not in progress, as determined at blocks 280–282, further execution of the routine is skipped, as indicated by the flow diagram line 284. Once it is determined that an upshift is in progress, the blocks 286–288 operate to initialize a DELAY TIMER for measuring delay time t0 — ta. Once the percentage of ratio completion (RATCOMP) reaches 20%, as determined at blocks 290–292, the block 294 is executed to initialize a SHIFT TIMER for measuring the shift time ta — tb, and to stop the DELAY TIMER. When RATCOMP reaches 80%, as determined at block 296, the blocks 298–300 are executed to reset the SHIFT IN PROGRESS indicator and to stop the SHIFT TIMER. In addition, the block 302 is executed to look-up a limit delay time (LDT) in relation to the measured shift time as described in reference to block 230 of FIG. 8.

The block 306 is then executed to look-up the pressures Pldt and Pmdt corresponding to the limit delay time LDT and the measured delay time MDT, as described in reference to block 232 of FIG. 8. The block 308 determines the overall pressure error PE according to the difference (Pmdt — Pldt). If this difference is positive, as determined at block 309, a run-through condition is indicated, and the remainder of the routine is executed to determine a corresponding pressure correction. However, if the difference is negative or zero, the blocks 310–314 are executed to determine the overall pressure error PE based on shift time considerations.

The block 310 determines a desired shift time DST in relation to the shift torque STQ and the target speed ratio Rdes, as described in reference to block 220 of FIG. 8. The block 312 determines the pressures Pmst and Pdst corresponding to the measured shift time MST and the desired shift time DST, as described in reference to block 222 of FIG. 8. The block 314 then determines the overall pressure error PE according to the difference (Pmst — Pdst). This difference may be positive or negative for increasing or decreasing the base pressure command defined at block 264 of FIG. 10.

Any time during the ratio progression, the execution of blocks 298–314 and the remainder of the flow diagram depicted in FIGS. 11b–11c may be skipped if the throttle position TPS or powertrain temperatures (TEMP) fall outside of prescribed limits, as determined at block 316. In this event, the block 318 is executed to set an OVERRIDE indicator so that block 280 will thereafter be answered in the affirmative.

Turning to FIG. 11b, the blocks 320–322 are first executed to zero the overall pressure error PE if its value lies within a deadband defined by ±db. The blocks 324–326 are then executed to apportion the overall pressure error between low and high pressure error cells PElo and PEhi, based on the low and high cell weight factors LCWF and HCWF. The weight factors, as indicated at blocks 233 and 236 of FIG. 8, are determined in relation to the shift torque STQ.

The blocks 328-334 compare the low cell pressure error PElo with a low cell adaptive correction integrator term ACIlo. If PElo is significantly negative, but ACIlo is positive, as determined at blocks 328-330, the block 336 is executed to reset ACIlo to zero. Similarly, if PElo is significantly positive, but ACIlo is negative, as determined at blocks 332-334, the block 338 is executed to reset ACIlo to zero. Otherwise, block 340 is executed to add PElo to ACIlo, updating the integrator term.

The blocks 342-348 compare the high cell pressure error PEhi with a high cell adaptive correction integrator term ACIhi. If PEhi is significantly negative, but ACIhi is positive, as determined at blocks 342-344, the block 350 is executed to reset ACIhi to zero. Similarly, if PEhi is significantly positive, but ACIhi is negative, as determined at blocks 346-348, the block 352 is executed to reset ACIhi to zero. Otherwise, block 354 is executed to add PEhi to ACIhi to update the integrator term.

The blocks 328-338 and 342-352, taken together, operate to reduce the influence of spurious data in the determination of pressure error PE. By resetting the integrator terms when the respective error cells suddenly change sign, adaptive pressure corrections based on the suspect pressure error information is avoided.

Turning to the flow diagram of FIG. 11c, the block 358 is first executed to determine low and high integrator factors IFlo and IFhi based on ACIlo and ACIhi, respectively, as described in reference to the block 244 of FIG. 8. The blocks 360-362 then apply IFlo and IFhi to the respective low and high pressure error cells PElo and PEhi to form low and high pressure correction terms PClo and PChi. Finally, the block 364 is executed to store the pressure correction terms PClo and PChi as a function of the target speed ratio Rdes, updating the two-point adaptive pressure correction table addressed at block 268 in FIG. 10.

While this invention has been described in reference to the illustrated embodiment, it is expected that various modifications will occur to those skilled in the art. In this regard, it should be realized that controls incorporating such modifications may fall within the scope of this invention, which is defined by the appended claims.

The embodiments of the invention in which an exclusive property or privilege is claimed are defined as follows:

1. In a motor vehicle multiple speed ratio automatic transmission including a fluid operated torque transmitting device to be engaged for shifting the transmission from a current speed ratio to a target speed ratio, a source of fluid pressure, regulator means for regulating said fluid pressure in accordance with a predetermined pressure command to form a regulated line pressure, a shift valve operative when activated to direct said line pressure to said torque transmitting device for engaging such device, and fluid accumulator means for absorbing a portion of the fluid directed to said torque transmitting device by said shift valve during a stroke interval of said shift, control apparatus comprising:

means effective during said shift to said target speed ratio for measuring (1) a delay time corresponding to an interval between the activation of said shift valve and a detected change in speed ratio, and (2) a shift time corresponding to the duration of said detected change in speed ratio;

means for comparing an operating point defined by the measured shift time and the measured delay time to a predetermined shift time vs. delay time function to detect an abnormal shift condition in which the change in speed ratio is completed after said stroke interval; and means for adjusting said predetermined pressure command in a direction to increase said regulated line pressure in subsequent shifting to said target speed ratio in response to a detection of said abnormal shift condition, thereby to prevent a recurrence of said abnormal shift condition.

2. The control apparatus set forth in claim 1, wherein the abnormal shift condition is characterized by a relatively long measured delay time in combination with a relatively short measured shift time.

3. The control apparatus set forth in claim 1, wherein the adjustment of said predetermined pressure command is determined in relation to a deviation between said operating point and said predetermined shift time vs. delay time function.

4. In a motor vehicle multiple speed ratio automatic transmission including a fluid operated torque transmitting device to be engaged for shifting the transmission from a current speed ratio to a target speed ratio, a source of fluid pressure, regulator means for regulating said fluid pressure in accordance with a predetermined pressure command to form a regulated line pressure, a shift valve operative when activated to direct said line pressure to said torque transmitting device for engaging such device, and fluid accumulator means for absorbing a portion of the fluid directed to said torque transmitting device by said shift valve during a stroke interval of said shift, control apparatus comprising:

means effective during said shift to said target speed ratio for measuring (1) a delay time corresponding to an interval between the activation of said shift valve and a detected change in speed ratio, and (2) a shift time corresponding to the duration of said detected change in speed ratio;

means responsive to the measured shift time to form a limit delay time corresponding to a delay time which characterizes an abnormal shift condition in which the change in speed ratio is completed after said stroke interval;

means for indicating the occurrence of said abnormal shift condition when said measured delay time exceeds said limit delay time; and means for adjusting said predetermined pressure command in a direction to increase said regulated line pressure in subsequent shifting to said target speed ratio in response to said indication of said abnormal shift condition, thereby to prevent a recurrence of said abnormal shift condition.

5. The control apparatus set forth in claim 4, wherein the adjustment of said predetermined pressure command is determined in relation to a deviation between said measured delay time and said limit delay time.

6. The control apparatus set forth in claim 4, wherein said means for adjusting said predetermined pressure command includes:

means for applying said limit delay time and said measured delay time to a predetermined delay time vs. line pressure characteristic to form first and second pressure signals corresponding to said limit and measured delay times, respectively;

means for forming a pressure correction in relation to the difference between said first and second pressure signals; and means for adjusting said predetermined pressure command in accordance with said pressure correction.

7. In a motor vehicle multiple speed ratio automatic transmission including a fluid operated torque transmitting device to be engaged for shifting the transmission from a current speed ratio to a target speed ratio, a source of fluid pressure, regulator means for regulating said fluid pressure in accordance with a predetermined pressure command to form a regulated line pressure, a shift valve operative when activated to direct said line pressure to said torque transmitting device for engaging such device, and fluid accumulator means for absorbing a portion of the fluid directed to said torque transmitting device by said shift valve during a stroke interval of said shift, control apparatus comprising:

means effective during said shift to said target speed ratio for measuring (1) a delay time corresponding to an interval between the activation of said shift valve and a detected change in speed ratio, and (2) a shift time corresponding to the duration of said detected change in speed ratio;

shift quality control means for adjusting said predetermined pressure command based on a detected deviation between said measured shift time and a predetermined shift time which is characteristic of high shift quality under normal conditions;

means for comparing an operating point defined by the measured shift time and the measured delay time to a predetermined shift time vs. delay time function to detect an abnormal shift condition in which the change in speed ratio is completed after said stroke interval; and override means for overriding the adjustment of said shift quality control means in response to a detection of said abnormal shift condition, and instead, adjusting said predetermined pressure command in a direction to increase said regulated line pressure in subsequent shifting to said target speed ratio, thereby to prevent a recurrence of said abnormal shift condition.

8. The control apparatus set forth in claim 7, wherein the abnormal shift condition is characterized by a relatively long measured delay time in combination with a relatively short measured shift time.

9. The control apparatus set forth in claim 7, wherein the adjustment of said predetermined pressure command by said override means is determined in relation to a deviation between said operating point and said predetermined shift time vs. delay time function.

* * * * *